US007187472B2

(12) United States Patent
Friedman et al.

(10) Patent No.: US 7,187,472 B2
(45) Date of Patent: Mar. 6, 2007

(54) ACTIVE COLOR CONTROL FOR A PRINTING PRESS

(75) Inventors: Michael Friedman, Windsor, NJ (US); Manojkumar Patel, Princeton Junction, NJ (US); Bruce Westberg, Jamesburg, NJ (US); Piyushkumar Patel, Hamilton, NJ (US)

(73) Assignee: Innolutions, Inc., Windsor, NJ (US)

( * ) Notice: Subject to any disclaimer, the term of this patent is extended or adjusted under 35 U.S.C. 154(b) by 969 days.

(21) Appl. No.: 10/234,304

(22) Filed: Sep. 3, 2002

(65) Prior Publication Data

US 2004/0042022 A1 Mar. 4, 2004

(51) Int. Cl.
*H04N 1/04* (2006.01)

(52) U.S. Cl. ........................ 358/1.9; 358/504; 358/496

(58) Field of Classification Search ................ 358/1.9, 358/2.1, 406, 504, 1.12, 468, 474–475, 486, 358/496

See application file for complete search history.

(56) References Cited

U.S. PATENT DOCUMENTS 5,543,922 A 8/1996 Runyan et al. ............. 356/402
5,724,259 A 3/1998 Seymour et al. ............ 364/526
5,791,249 A 8/1998 Quadracci ................ 101/450.1
5,967,049 A 10/1999 Seymour et al. ............ 101/484
5,967,050 A 10/1999 Seymour .................... 101/484
5,992,318 A 11/1999 DiBello et al. ............. 101/181
6,058,201 A 5/2000 Sikes et al. ................. 382/112
6,318,260 B1 11/2001 Chu et al. ................... 101/365

*Primary Examiner*—Thomas D. Lee
*Assistant Examiner*—Stephen Brinich
(74) *Attorney, Agent, or Firm*—Roberts & Roberts, LLP

(57) ABSTRACT

A system for the accurate measurement and control of image color density on an operating printing press. The method and apparatus control the printing of a multicolored image by controlling the amount of each of the inks used to print an image based on the color densities of each of the inks detected in printed images. The process includes controlling the positioning and linear movement of a strobe and a digital video camera across a substrate having images printed thereon; illuminating the images with a strobe; selecting and acquiring the images via a digital video camera and producing a digitized representation thereof; selecting a portion of the images; measuring and analyzing the color intensity of the selected portion of the images and producing reflective density values thereof, and storing said reflective density values in a first memory; comparing the reflective density values for the portion of the images to standard density values in a second memory for the portion of the images.

31 Claims, 10 Drawing Sheets

ACTIVE COLOR CONTROL FOR A PRINTING PRESS

BACKGROUND OF THE INVENTION

1. CD-ROM Appendix

The computer program listing appendix referenced, included and incorporated in the present application is included in a single CD-ROM appendix labeled "ACTIVE COLOR CONTROL FOR A PRINTING PRESS" which is submitted in duplicate. The CD-ROM appendix includes 72 files. The computer program is incorporated herein by reference.

2. Field of the Invention

The present invention relates a system for the accurate measurement and control of image color density on a printing press. More particularly, the invention provides a method and apparatus for controlling the amount of each of the inks used to print an image based on the color densities of each of the inks detected in printed images.

3. Description of the Related Art

Color perception of a printed image by the human eye is determined by the light reflected from the printed substrate. Changing the amount of ink applied to the substrate changes the amount of color on a printed substrate, and hence the quality of the perceived image.

Each of the individual single images is produced with a specific color ink. A multi-colored printed image is produced by combining a plurality of superimposed single color printed images onto a substrate. To create a multi-colored image, inks are applied at a predetermined pattern and thickness, or ink density. The ink patterns are generally not solid, but are composed of arrays of dots which appear as a solid colors when viewed by the human eye at a distance. The images produced by such arrays of colored dots are called halftones. The fractional coverage of the dots of a halftone ink pattern is referred to as the density of the ink pattern. For example, when ink dots are spaced so that half the area of an ink pattern is covered by ink and half is not, the dot density of the ink pattern is considered to be 50%.

The color quality of a multi-colored printed image is determined by the degree to which the colors of the image match the desired colors for the image, i.e. the colors of a reference image. Hence, the obtained quality of a multi-color image is determined by the density of each of the individual colored images of which the multi-colored image is composed. An inaccurate ink density setting for any of the colors may result in a multi-colored image of inferior color quality. An offset printing press includes an inking assembly for each color of ink used in the printing process. Each inking assembly includes an ink reservoir as well as a segmented doctor blade disposed along the outer surface of an ink fountain roller. The amount of ink supplied to the roller train of the press and ultimately to a substrate, such as paper, is adjusted by changing the spacing between the edge of the blade segments and the outer surface of the ink fountain roller. The position of each blade segment relative to the ink fountain roller is independently adjustable by movement of an ink control device such as an adjusting screw, or ink key, to thereby control the amount of ink fed to a corresponding longitudinal strip or ink key zone of the substrate. The ink control mechanism includes any device that controls the amount of ink fed to a corresponding longitudinal strip or zone of the substrate. The ink control keys each control the amount of ink supplied to a respective ink key zone on the substrate.

In the printing industry, color bars have been used for a long time to measure color density. A color bar comprises a series of patches of different colors in each ink key zone. To get the required density of the printed information on a substrate, the press operator measures the density of the color patches in the required ink key zone. The ink density of a color is determined by the settings of the ink supply for the ink of that color. A printing press operator adjusts amount of ink applied to the substrate to get the desired color. Opening a key increases amount of ink along its path and vice versa. If ink density of the patch is too low, the operator opens the ink key to increase amount of ink. If ink density of the patch is too high, the operator closes the ink key to decrease amount of ink. It is assumed that the change in color density of patches also make similar changes in the color density of the desired printed image. However, it is well known in the printing industry that this assumption is not always correct. To adjust for this discrepancy, press operator takes a color bar patch density only as a guide, and final color adjustments are made by visually inspecting the printed image and also by measuring density of critical areas in the print.

At the start of a printing run, the density settings for the various color inks must be set to achieve the appropriate ink density levels for the individual color images in order to produce multicolor images with the desired colors. Additionally, adjustments to the ink density settings may be required to compensate for deviations in the printing parameters of colors during a printing run. Such deviations may be caused by alignment changes between various rollers in the printing system, the paper stock, web tension, room temperature and humidity, among other factors. Adjustments may also be required to compensate for printing parameter deviations that occur from one printing run to another. In the past, such ink density adjustments have been performed by human operators based merely on conclusions drawn from the visual inspection of printed images. However, such manual control methods tended to be slow, relatively inaccurate, and labor intensive. The visual inspection techniques used in connection with ink key presetting and color control are inaccurate, expensive, and time-consuming. Further, since the required image colors are often halftones of ink combined with other ink colors, such techniques also require a high level of operator expertise.

Methods other than visual inspection of the printed image are also known for monitoring color quality once the press is running. Methods have been developed to control ink supplies based on objective measurements of the printed images. To conduct the task of color density measurement, offline density measurement instruments are available. Quality control of color printing processes can be achieved by measuring the optical density of a test target image. Optical density of various points of the test target image can be measured by using a densitometer or scanning densitometer either off-line or on-line of the web printing process. Typically, optical density measurements are performed by illuminating the test target image with a light source and measuring the intensity of the light reflected from the image.

A press operator may take a sample of a printed substrate with the color bars and place it in a test instrument. A typical instrument has a density scanning head traveling across the width of color bars. After scanning, the instrument displays density measurements on a computer screen. Upon examining the density values on display and also examining the printed sample, the operator makes necessary changes to the ink keys. This procedure is repeated until satisfactory print quality is achieved. Known methods for controlling printed colors have included the use of such a densitometer to measure the density of color bars printed in a margin outside the area of the printed image. In such prior art systems, one color bar is printed for each of the base colors, and the densitometer measures the ratio of light reflected from bare paper to light reflected from the color bars in order to determine appropriate ink density settings. A disadvantage of using a densitometer is that one must look to the separately printed color bars. If the colors of the color bars are true, then one must presume that the colors in the printed image are, therefore, also correct. However, if the colors in the color bar do not exactly represent the colors of the image, then the ink density settings based on the color bar measurements will be inaccurate. Another approach to controlling the printing of colors involves the use of a spectrophotometer which measures reflected light intensity as a function of wavelength. Spectrophotometer measurements represent the value of reflected light intensity in given spectrum segments of the light spectrum scanned. The spectrophotometer method determines the ink density for each color in an image. The spectrophotometer method also has the disadvantage of requiring one to presume that what is observed in a reference color bar correctly indicates what occurs in the printed image. A key disadvantage of these techniques is that they must be performed off-line. That is, a sample of the printed substrate must be measured either while the press is stopped or the sample taken away from the press. This involves considerable downtime and wasted printing during trial and error ink level correction.

To automate this task, online density measurement instruments are known. While the press is running, it is common for a press operator to continually monitor the printed output and to make appropriate ink key adjustments in order to achieve appropriate quality control of the color of the printed image. For example, if the color in a zone is too weak, the operator adjusts the corresponding ink key to allow more ink flow to that zone. If the color is too strong, the corresponding ink key is adjusted to decrease the ink flow. During operation of the printing press, further color adjustments may be necessary to compensate for changing press conditions, or to account for the personal preferences of the customer.

Online instruments comprise a scanning assembly mounted on the printing press. The test target image that is measured is often in the form of a color bar comprised of individual color patches. The color bar typically extends the width of the web (see FIG. 7). Typically, color bars are scanned on the printing press at the patches, which include solid patches and halftone patches for each of the primary ink colors, as well as solid overprints. The color bar is often printed in the trim area of the web and may be utilized for registration as well as color monitoring purposes. Each solid patch has a target density that the color control system attempts to maintain. The inking level is increased or decreased to reach this target density. Instruments that can measure density on the press and also automatically activate ink keys on the press to bring color density to a desired value are commonly known as Closed Loop Color Controls. Instruments vary in the way they scan color bars and calculate color patch density. Different scanning methods can be categorized into two groups. A first group uses a spectrophotometer mounted in the imaging assembly. A video camera and strobe are used to freeze the image of moving substrate and accurately locate color bars. The spectrophotometer then takes a reading of the color patch. For positioning color patches in Y direction, a cue mark and a photo sensor are used. For distinguishing color patches from print, a special shape of color patch is required for this instrument. A second group uses video cameras mounted in an imaging assembly. Typically, a color camera with a xenon strobe is used to freeze the motion of moving substrate and acquire an image. Most manufacturers use an analog 3 CCD camera, in which prisms are used to split red, green and blue channels. Analog signals from these three channels are fed to frame grabbing electronics to digitize and store image. Examples of these prior systems are disclosed in U.S. Pat. Nos. 5,543,922; 5,724,259; 5,967,049; 5,967,050, 5,992,318; 6,058,201; and 6,318,260. It has been found according to the present invention that by use of a digital video camera, direct digital signals for each color channel are made available for processing without requiring analog to digital conversion which loses some degree of color resolution.

Prior patentees have also used flashing xenon strobes for illuminating the moving substrate for a short period of time. Xenon strobes work on the principle of high voltage discharge through a tube filled with xenon gas. However, it is well known that the light intensity from strobe to strobe is not consistent. This becomes a problem in color density measurement since variation in strobe intensity provides false readings. To overcome this problem, one patentee uses a light output measurement device in front of the strobe and provides correction in color density calculations. As an additional disadvantage, the xenon strobes work with a high voltage and drive electronics generate electrical noise and heat. These features make it more difficult to package a camera and xenon strobe in a single sealed imaging assembly. Another system therefore mounts the strobe away from camera and transmits light through a light pipe. In one embodiment of the present invention, this problem is solved by use of a high intensity white light emitting diodes instead of xenon strobes.

The invention not only concerns the measurement and determination of color density variations, but also a method for controlling the plurality of ink control mechanisms, or keys on a printing press for on-the-run color correction. The inventive system includes the process of measuring color values for selected images printed on the substrate to produce an acquired image array. Then, the acquired image is compared with a standard image array comprised of standard color values for the image areas. Ink adjustments are then calculated for each ink key zone and adjustment of the ink control mechanisms maintains the desired color density of the images.

Importantly, since the color bars do not always indicate the colors of the image to be printed, the invention allows a determination and adjustment of image density not only at color bars, but also at any portion of the entire printed image across the substrate. Once the desired key adjustments for a particular printing job are determined, the values of the key positions can also be stored in a computer memory for setup use at another time.

SUMMARY OF THE INVENTION

The invention provides an apparatus for measuring the reflective density of one or more colored image portions, having one or more colors, which are printed on a planar substrate comprising:

(a) a digital video camera capable of acquiring one or more colored images, which images have one or more colors and which are printed on a planar substrate, and producing a digitized representation thereof;

(b) a strobe for illuminating the one or more colored images;

(c) a linear drive for moving the strobe and camera together across the substrate;

(d) a drive controller for controlling the positioning and movement of the strobe and camera across the substrate to a position of the image at any location linearly on the substrate;

(e) an encoder/controller for positioning the strobe and camera to a position of the one or more colored images at any location on the substrate, in a direction perpendicular to the direction of movement of the linear drive;

(f) a first selector for directing the camera at one or more colored images positioned on the substrate;

(g) a second selector for selecting a portion of the image;

(h) a processor for measuring and analyzing the color intensity of the portion of the image and producing a reflective density values thereof, (i) a first memory for storing said reflective density values;

(j) a second memory for storing standard density values for the portion of the one or more colored images;

(k) a comparator for comparing the reflective density values for the portion of the one or more colored images to the standard density values for the portion of the one or more colored images.

The invention also provides a process for measuring the reflective density of one or more colored image portions, having one or more colors, which are printed on a planar substrate comprising:

(a) controlling the positioning and linear movement of a strobe and a digital video camera across a planar substrate, which substrate has one or more colored images having one or more colors printed thereon;

(b) illuminating the one or more colored images printed on the substrate with a strobe;

(c) selecting and acquiring one or more of the colored images via the digital video camera, and producing a digitized representation thereof;

(d) selecting a portion of the one or more of the colored images;

(e) measuring and analyzing the color intensity of the selected portion of the one or more colored images and producing reflective density values thereof, and storing said reflective density values in a first memory;

(f) comparing the reflective density values for the portion of the one or more colored images to standard density values in a second memory for the portion of the one or more colored images.

The invention further provides a color control system for controlling the amount of ink fed from a plurality of inking units in a multicolored printing press onto a planar substrate fed through the press, which substrate is in a web or sheet form, said substrate having a plurality of spaced apart color marker images printed thereon from the inking units, which images extend across the width of the substrate, which printing press comprises a plurality of adjustable ink control mechanism across the inking units to control the amount of ink fed from the inking units onto the substrate, the system comprising:

(a) a digital video camera capable of acquiring one or more colored images, which images have one or more colors and which are printed on a planar substrate, and producing a digitized representation thereof;

(b) a strobe for illuminating the one or more colored images;

(c) a linear drive for moving the strobe and camera together across the substrate;

(d) a drive controller for controlling the positioning and movement of the strobe and camera across the substrate to a position of the one or more colored images at any location linearly on the substrate;

(e) an encoder/controller for positioning the strobe and camera to a position of the one or more colored images at any location on the substrate, in a direction perpendicular to the direction of movement of the linear drive;

(f) a first selector for directing the camera at one or more colored images positioned on the substrate;

(g) a second selector for selecting a portion of the one or more colored images;

(h) a processor for measuring and analyzing the color intensity of the portion of the one or more colored images and producing a reflective density values thereof, (i) a first memory for storing said reflective density values;

(j) a second memory for storing standard density values for the portion of the one or more colored images;

(k) a comparator for comparing the reflective density values for the portion of the one or more colored images to the standard density values for the portion of the one or more colored images;

(l) a calculator for calculating the amount of adjustment required for the ink control mechanisms on the press to maintain the color density of the portion of the one or more colored images; and (m) an ink controller for effecting adjustment of the ink control mechanisms to maintain the color density of the portion of the one or more colored images.

The invention still further provides a process for controlling the amount of ink fed from a plurality of inking units in a multicolored printing press onto a planar substrate fed through the press, which substrate is in a web or sheet form, said substrate having a plurality of spaced apart color marker images printed thereon from the inking units, which images extend across the width of the substrate, which printing press comprises a plurality of adjustable ink control mechanism across the inking units to control the amount of ink fed from the inking units onto the substrate, the system comprising:

(a) controlling the positioning and linear movement of a strobe and a digital video camera across a planar substrate, which substrate has one or more colored images having one or more colors printed thereon;

(b) illuminating the one or more colored images printed on the substrate with a strobe;

(c) selecting and acquiring one or more of the colored images via the digital video camera, and producing a digitized representation thereof;

(d) selecting a portion of the one or more of the colored images;

(e) measuring and analyzing the color intensity of the selected portion of the one or more colored images and producing reflective density values thereof, and storing said reflective density values in a first memory;

(f) comparing the reflective density values for the portion of the one or more colored images to standard density values in a second memory for the portion of the one or more colored images.

(g) calculating the amount of adjustment required for the ink control mechanisms on the press to maintain the color density of the portion of the one or more colored images; and (h) effecting adjustment of the ink control mechanisms to maintain the color density of the portion of the one or more colored images.

The invention also provides a process for controlling the amount of ink fed from a plurality of inking units in a multicolored printing press onto a planar substrate fed through the press, which substrate is in a web or sheet form, said substrate having a plurality of spaced apart color marker images printed thereon from the inking units, which images extend across the width of the substrate, which printing press comprises a plurality of adjustable ink control mechanism across the inking units to control the amount of ink fed from the inking units onto the substrate, the system comprising (i) providing a color control system comprising:
  - (a) a digital video camera capable of acquiring one or more colored images, which images have one or more colors and which are printed on a planar substrate, and producing a digitized representation thereof;
  - (b) a strobe for illuminating the one or more colored images;
  - (c) a linear drive for moving the strobe and camera together across the substrate;
  - (d) a drive controller for controlling the positioning and movement of the strobe and camera across the substrate to a position of the one or more colored images at any location linearly on the substrate;
  - (e) an encoder/controller for positioning the strobe and camera to a position of the one or more colored images at any location on the substrate, in a direction perpendicular to the direction of movement of the linear drive;
  - (f) a first selector for directing the camera at one or more colored images positioned on the substrate;
  - (g) a second selector for selecting a portion of the one or more colored images;
  - (h) a processor for measuring and analyzing the color intensity of the portion of the one or more colored images and producing a reflective density values thereof,
  - (i) a first memory for storing said reflective density values;
  - (j) a second memory for storing standard density values for the portion of the one or more colored images;
  - (k) a comparator for comparing the reflective density values for the portion of the one or more colored images to the standard density values for the portion of the one or more colored images;
  - (l) a calculator for calculating the amount of adjustment required for the ink control mechanisms on the press to maintain the color density of the portion of the one or more colored images; and (ii) effecting adjustment of the ink control mechanisms to maintain the color density of the portion of the one or more colored images.

DETAILED DESCRIPTION OF THE PREFERRED EMBODIMENT

Figure 1:
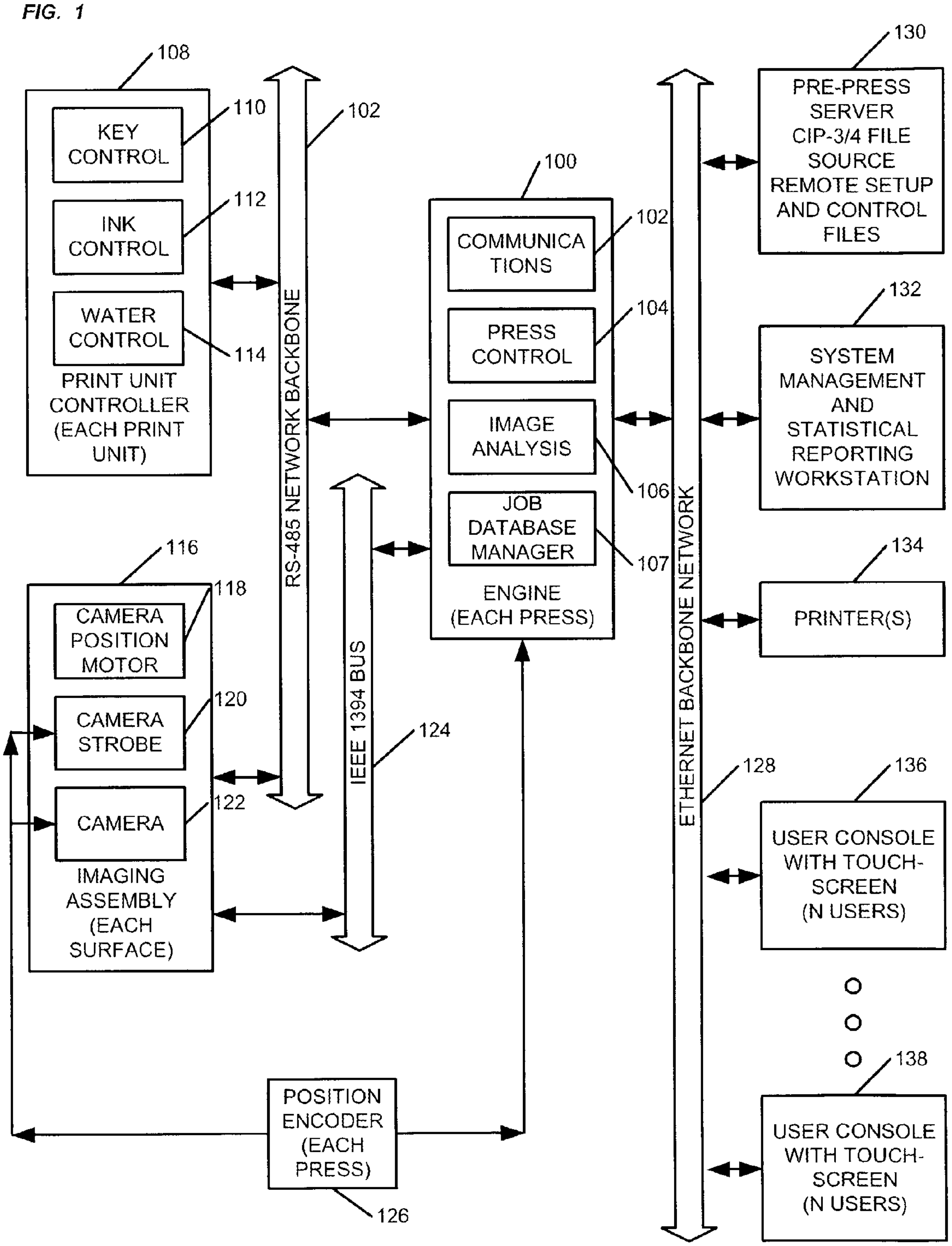
FIG. 1 is a schematic representation of the component parts of the inventive system.

The invention provides an apparatus for measuring and correcting the reflective density of colored images printed on a moving substrate during operation of a printing press. The press has an adjustable ink control mechanism for controlling the amount of color ink that is to be transferred to the substrate at spaced apart locations across the width of the press during a printing operations. The printing press has a plurality of inking assemblies which includes an ink reservoir, and a segmented blade disposed along the outer surface of an ink fountain roller. The amount of ink supplied to the roller train of the press and ultimately to a substrate is adjusted by changing the spacing between the edge of the blade segments and the outer surface of the ink fountain roller. An individual printing assembly is required for each color to be printed. The invention provides an imaging apparatus for each surface of the substrate to be scanned as well as computerized density measurement, density comparison to a standard, and ink feedback and adjustment controls.

The invention includes one imaging assembly per surface scanned. Each imaging assembly comprises a digital video camera and strobe light arrangement. Suitable digital video cameras are commercially available, such as a Sony DFW-VL500. The camera is connected to an industry standard IEEE 1394 (Firewire) interface for setup as well as for transferring the acquired images into a computer. The camera has built in motorized zoom, motorized iris and motorized focus control that can be controlled using the IEEE 1394 interface from the computer. Each camera is individually addressable.

The images are illuminated via a strobe light assembly. In order to overcome problems of xenon strobes, it is preferred to use one or more white light emitting diodes (LEDs). Very bright white LEDs, are commercially available under the tradename Luxeon from Lumileds Lighting, LLC of San Jose Calif., or white LED model NSPW315 BS from Nichia America Corporation of Mountville, Pa. Such LEDs provide a light output ranging from about 35 lumens to about 350 lumens in intensity. The color temperature, or white point of the light ranges from about 4500 to about 6500 degrees Kelvin. This is color corrected using the matrix equation described below. The light assembly can have one point light source or an array of multiple light sources. It may have two modes of operation namely a pulsed mode for freezing the motion of a substrate and acquiring an image or a continuous mode for calibration. This continuous operation mode is not possible with conventional xenon strobe lights. The camera trigger pulse width and its timing relationship to the strobe is very important. The strobe's electronics condition the input trigger signal for appropriate camera triggering.

Power for the imaging assembly is provided from a commercially available 24 VDC switching power supply. The mode input to the imaging assembly is provided from an input/output board mounted in a computer. The trigger input signal is generated by a high speed counter board mounted in the computer driven from a quadrature phase encoder coupled to one printing cylinder on the press.

FIG. 1 provides schematic representation of the invention. Control and functioning of the parts of the invention is via a general purpose computer such as a personal computer or workstation whose functions are specialized by the computer program which is an appendix to and incorporated in this application. Shown is an engine 100 whose functions include communications 102, press control 104, job database management 107 and image analysis 106. The communications 102 function takes care of the communication between the engine and all of the peripherals attached to the engine. The press control function 104 provides control signals for moving the ink adjusting mechanism on the press. The image analysis function 106 analyses the image acquired from the imaging assembly 116. Job database management 107 stores all information related to the users use of the system.

Three modes of communication are provided for the engine to communicate with various peripherals attached to the engine. An industry standard Ethernet backbone network 128 is provided to communicate with a pre-press server 130, a system management and statistical reporting workstation 132, printers 134 and single or multiple user consoles 136 and 138. An industry standard IEEE 1394 bus 124 is provided to communicate with a digital camera at position 122 to pass instructions to the camera and also to acquire image information from the camera. One imaging assembly at position 116 is provided for each surface of the substrate. Each imaging assembly comprises a DC servomotor at position 118 for positioning the assembly across a substrate, a digital camera at position 122 and a strobe at position 120. The strobe illuminates the field of view for a very short period of time and the image is acquired by the camera. The strobe's illumination is synchronized with the position of the camera in relation to the substrate by an input trigger signal from an encoder and controller 126. The same trigger signal is also transmitted to the camera to synchronize image acquisition with strobe illumination. An industry standard RS-485 Network Backbone 102 is provided for communication between the engine 100 and print unit controller 108, and also between engine 100 and imaging assembly 116. One print unit controller 108 is provided per printing unit on the printing press. The print unit controller provides the functions of key control 110, ink control 112 and water control 114. Depending on printing process and printing press design, ink control and water control may or may not be present.

Figure 6A:
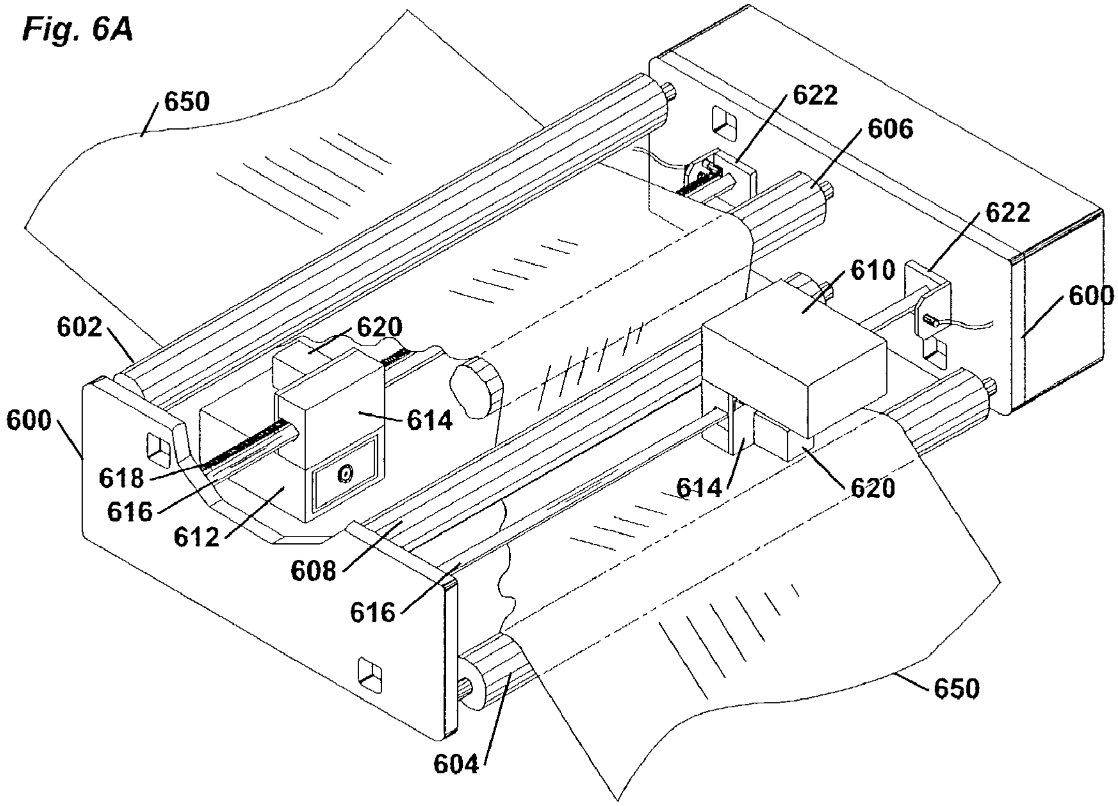
FIG. 6A and FIG. 6B are perspective and side views of equipment for scanning a printed web by mounted strobes and cameras.
Figure 6B:
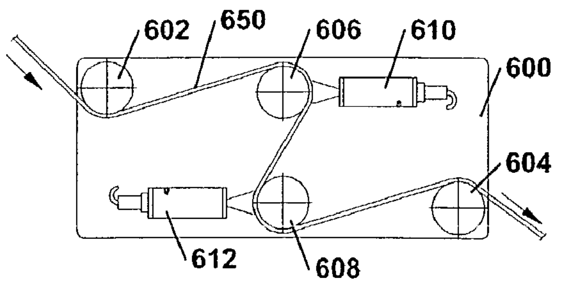

A typical apparatus for scanning an image on a traveling web 650 is shown in FIG. 6A and 6B. The apparatus comprises two opposing frames 600. A web lead-in roller 602 is provided to accept web 650 from previous process equipment. A web lead-out roller 604 is provided to deliver the web to the next process equipment on the printing line. Between lead-in roller 602 and lead-out roller 604, the web 650 may travel over two guide rollers 606, 608. The imaging assembly 610 comprises a CCD digital camera capable of acquiring colored images and one or more strobe lights for illuminating the colored images. Imaging assembly 610 scans the top side of the web 650 passing over roller 606. Another imaging assembly 612 comprises another CCD digital camera and another strobe light for scanning the bottom side of the web 650 passing under roller 608. Both imaging assemblies 610 and 612 are mounted on a carriage 614, which moves and positions the camera and strobe at an operator specified location across the web width. The carriage 614 is equipped with v-groove guide 616. Guide wheels keep the imaging assemblies on the guide 616. The carriage 614 is also equipped with a linear drive in the form of DC servomotor 620 and a timing belt pulley installed on the shaft of the motor. A timing belt 618 is provided across the width of the carriage guide. The stationary timing belt is installed with two ends anchored to the brackets near the opposite ends of travel of the imaging assembly. Rotation of the motor 620 on the carriage moves the carriage 614, motor 620 and imaging assembly 612, 614 across the web. A carriage guide is mounted on the mounting brackets 622, which is subsequently mounted on the frames 600. A proximity sensor may be provided at one or both ends of the track and guide system to sense the end of travel for the imaging assembly. The proximity sensors may be connected to the servomotor input. A drive controller program controls the positioning and movement of the strobe and camera across the substrate to a position of the image at any location linearly on the substrate. The DC servomotor 620 communicates with the computer through an RS-485 network. All devices on RS-485 network are individually addressable. Each imaging assembly servomotor 620 is programmed with a different network address. In the preferred embodiment, the imaging assemblies 614 are controlled by a computer engine which includes the appendix computer program, a processor based motherboard together with serial ports, parallel ports, floppy disk and CD-ROM drives and controllers, hard drive controller, USB ports and expansion slots, video controller board to drive display monitors, IEEE 1394 (Firewire) interface card with multiple ports to communicate with cameras; Ethernet networking interface card to communicate with consoles and other devices on the network; an input/output board to interface with other devices, an encoder board to take quadrature and index signals from the encoder and provide trigger signals to the appropriate imaging assembly.

Figure 9:
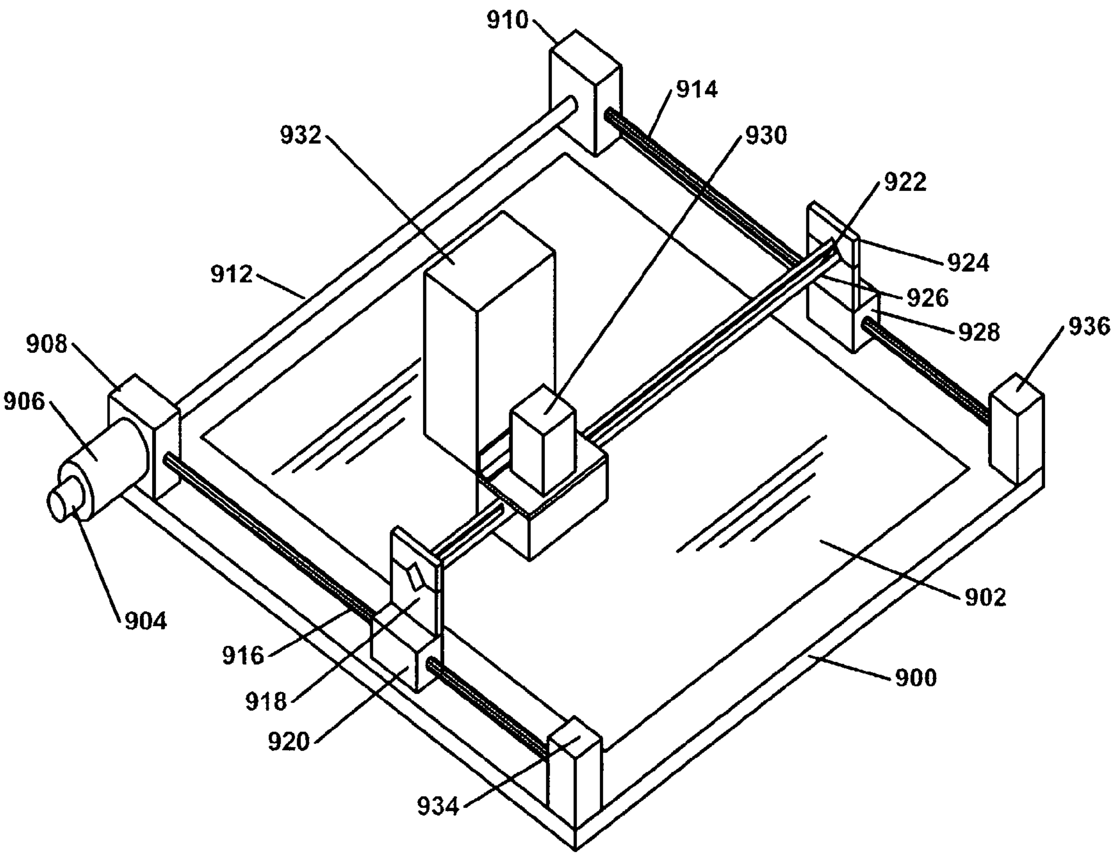
FIG. 9 describes an arrangement with a stationary substrate and a moving imaging assembly.

FIG. 9 describes an arrangement where the substrate is stationary and the imaging assembly 932 is mounted on a carriage with DC servomotor 930. In this embodiment the linear drive comprises two portions, one which moves the imaging assembly in the X axis direction and one which moves the imaging assembly in the Y axis direction in relation to the plane of substrate 902. The carriage moves on a rail 926 across the width of substrate 902, also known as the X axis. A fixed timing belt 922 is anchored to the supports 924, 918. A rail is also supported on two ends with supports 924, 918. Supports 918, 924 are mounted on brackets 920, 928 with nuts. The whole subassembly travels along the Y axis on two screws 914, 916. Both screws are supported on one end with brackets 934, 936. The other end of both screws is driven by bevel gear assemblies 908, 910. Bevel gear assemblies 908,910 are coupled together with a shaft 912. Both bevel gear assemblies are driven by a DC servomotor 906. An encoder 904 is attached to the motor shaft to give feedback for the Y axis position of the imaging assembly. The whole assembly is mounted on a base 900 which also serves as a support for substrate 902. In this arrangement, the substrate is held stationary and imaging assembly moves in both the X and Y orthogonal directions in relation to the plane of substrate 902.

An external RS-232 to RS-485 converter is provided for communication with the imaging assembly positioning motors and print unit controllers in the system. While RS-232 is the standard amongst personal computers, the RS-485 standard provides additional margins against communications errors and increased signaling distance. Single or multiple consoles with touch screens can communicate with the engine using an Ethernet backbone. The engine also communicates with multiple print unit controllers to set and read ink key positions, water settings, ink roller settings and other print unit functions. In addition to this, the print unit controller reports any faults and exceptions information to the engine. The engine can communicate with custom print unit controllers or it can communicate with industry standard print unit controllers with a suitable protocol. The engine can also communicate with a pre-press system to get job settings and ink key presetting data. The standard format in the industry is the CIP3 file format, but other file formats can also be used to communicate job specific details from the pre-press software to the engine.

A console is preferred which comprises a computer with an Ethernet network adapter and a touch screen. All operations for the system may be performed using the touch screen of the console. Some operations may be performed directly on the engine using its local keyboard, mouse and video screen.

An encoder/controller is installed on the printing press coupled to a printing cylinder. The encoder/controller is for positioning the strobe and camera to a position of the one or more colored images at any location on the substrate, in a direction perpendicular to the direction of movement of the linear drive. The encoder/controller has three channels, Channel A, B and Z. Channel A and B are in quadrature relation with each other. Typical channel resolution is 2500 pulses per revolution of the encoder/controller shaft yielding 10,000 pulses per revolution of encoder shaft. Channel Z provides one index pulse per revolution of the encoder shaft. All three channel signals are connected to the encoder/controller board in the engine. Encoder/controller board's function is to reliably count each encoder pulse. The engine can set at least one count value into the encoder board per surface. When the encoder/controller count matches the set value, the encoder/controller board activates an output trigger pulse for the corresponding surface, initiating image acquisition from camera and strobe. In this way printed color bars may appear anywhere on the substrate and the computer engine will be able to synchronize the imaging assembly.

Printing press interface signals are read and set using the input/output board. Typical signals read from press are press printing, blanket wash, press inhibit. These are used to determine when accurate imaging may commence. Outputs from the system are provided to reset the imaging assemblies, and produce quality alarms and scan errors alerts. The computer and the appendix program include a first selector for directing the camera at one or more colored images positioned on the substrate; a second selector for selecting a portion of the image; a processor for measuring and analyzing the color intensity of the portion of the image and producing a reflective density values thereof, a first memory for storing said reflective density values; a second memory for storing standard density values for the portion of the one or more colored images; a comparator for comparing the reflective density values for the portion of the one or more colored images to the standard density values for the portion of the one or more colored images. The computer and the appendix program also include a processor for calculating the amount of adjustment required for the ink control mechanisms on the press to maintain the color density of the portion of the one or more colored images; and an ink controller for effecting adjustment of the ink control mechanisms to maintain the color density of the portion of the one or more colored images.

Figure 3:
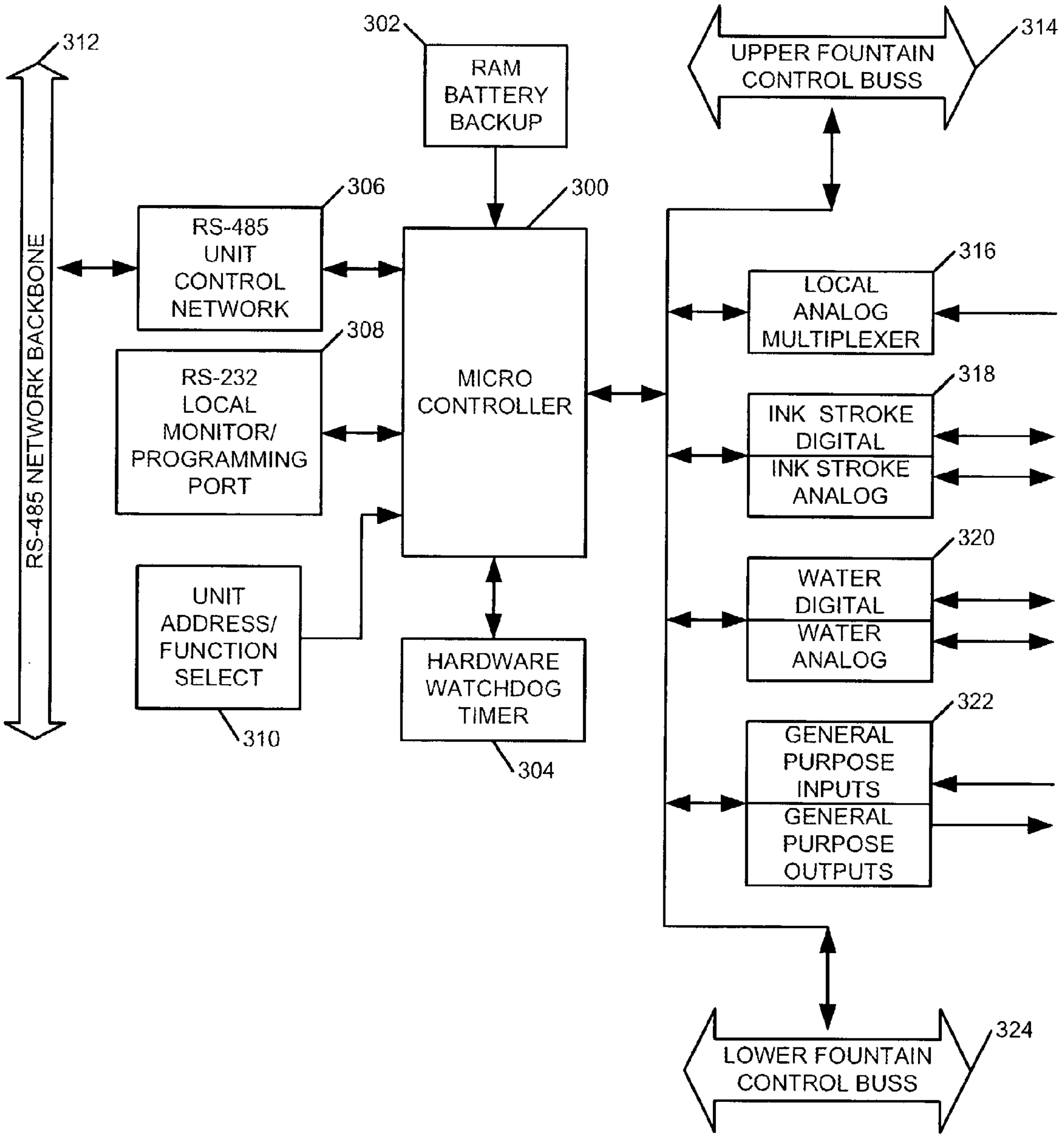
FIG. 3 is a schematic representation of the component parts of the print unit controller.

FIG. 3 is a schematic representation of the component parts of the print unit controller 108. It comprises a microcontroller 300 for logic control, a RAM battery backup 302 to save memory and status in case of a power loss, a hardware watchdog timer 304 to continuously monitor for reliable operation of print unit controller, an RS-485 Network controller 306 to communicate with the RS-485 network backbone 312. Additional hardware is provided for an RS-232 local monitoring and programming port 308. Unit address and function select 310 hardware is provided in each print unit controller to provide a unique network identity. Each print unit controller can control two ink fountains on a printing press. The upper fountain control buss 314 and lower fountain control buss 324 are connected to micro controller 300. The microcontroller is also attached to ink stroke 318 and water 320 input/output hardware for analog or digital signal input/output interfacing. General purpose inputs and outputs are provided for interfacing with various other events and functions on a printing press. A local analog multiplexer 316 is provided for reading analog signals from various inputs on the processor board. Other general purpose inputs and outputs 322 are optional.

Figure 4:
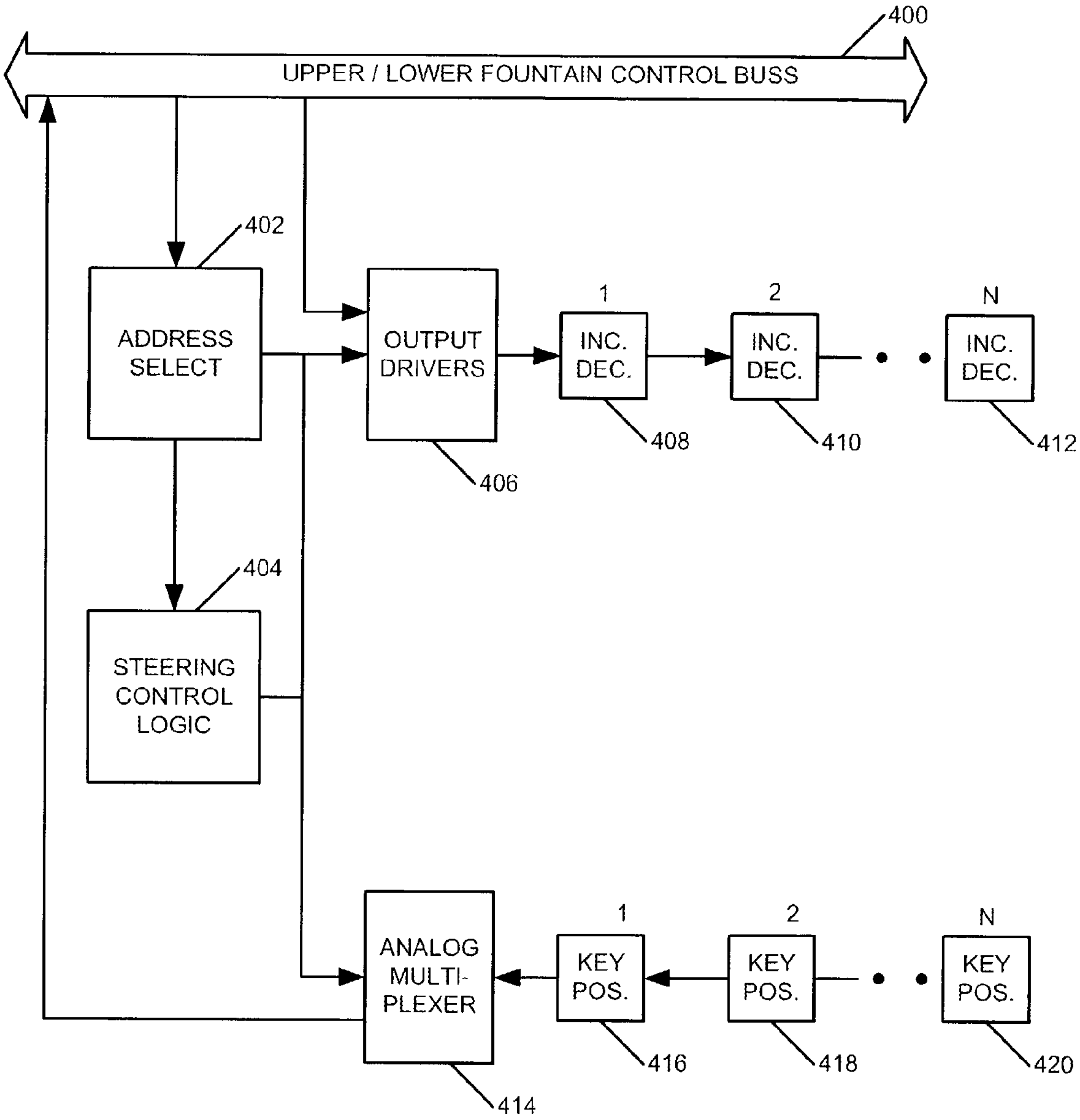
FIG. 4 is a schematic representation of the component parts of a fountain key adapter.

FIG. 4 is a schematic representation of the component parts of a fountain key adapter/controller which provides actuation and feedback from the ink control keys on the press. This allows the print unit controller to monitor and adjust each ink key individually upon request from engine 100. The actual ink keys may be provided by the press manufacturer, and are equipped with electric motors for actuation and potentiometers for position indication. When the print unit controller desires to move an ink key, it presents binary information on upper or lower fountain control buss 314, 324, 400 which activates the appropriate output drivers 406 via steering control logic 404. The print unit controller reads the actual position of the ink key by applying a bias voltage to the potentiometer of the key and reading back the voltage, which is proportional to the key position, via analog multiplexer 414 and digital converter 316. When the position indicated is equal to the desired position of the ink key, the motor is deactivated. In addition, the position is constantly monitored by the print unit controller, and if the position is found to have changed the motors will automatically activate to return the key to its set position. Any number of fountain key controllers may be present on the buss to control n keys 408, 410, 412 and their associated potentiometers 416, 418, 420. The print unit controller operates ink control 318 and water 320 control in the same way as ink keys.

Figure 5:
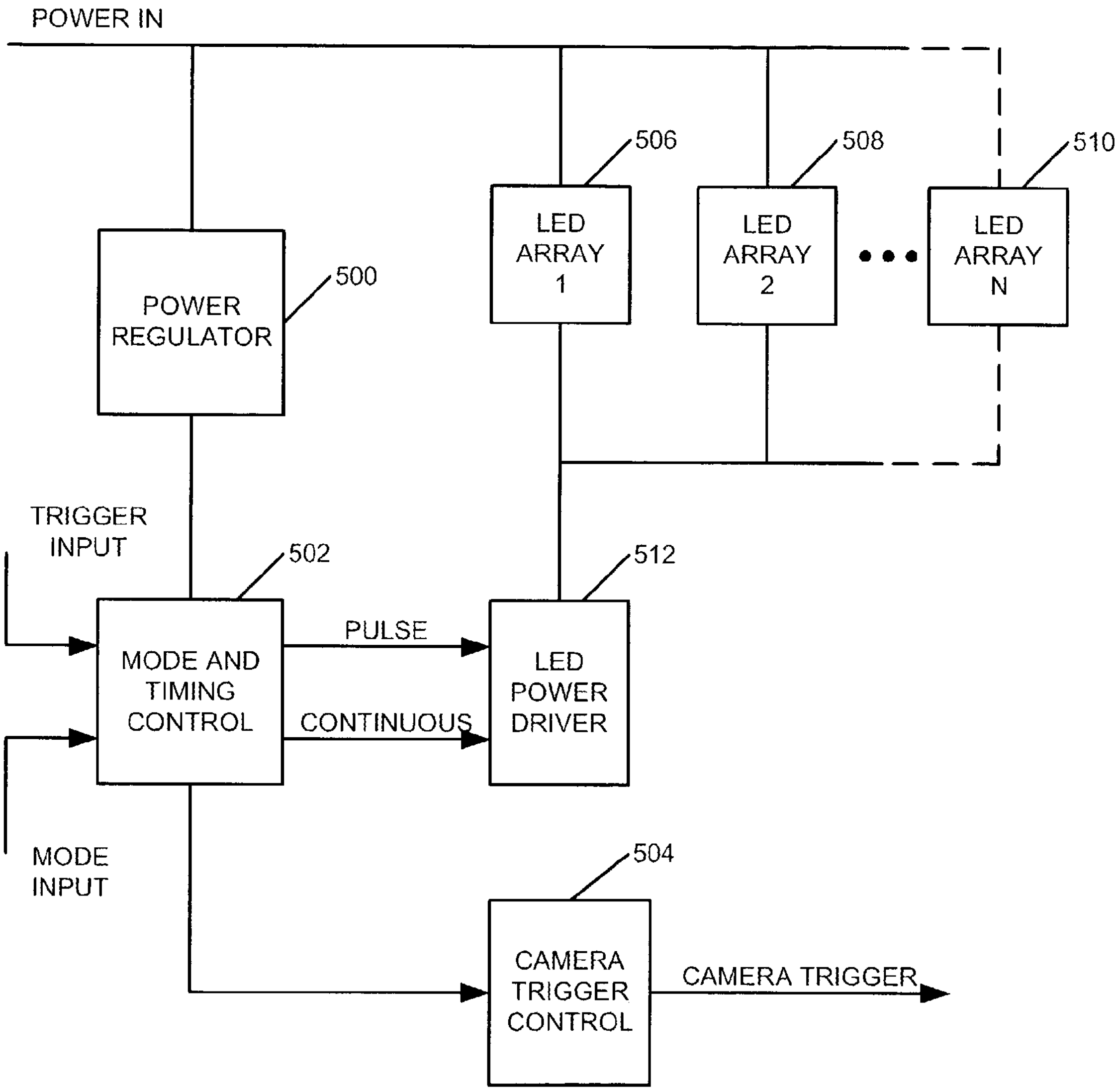
FIG. 5 is a block diagram of strobe and camera control routines.
Figure 8A:
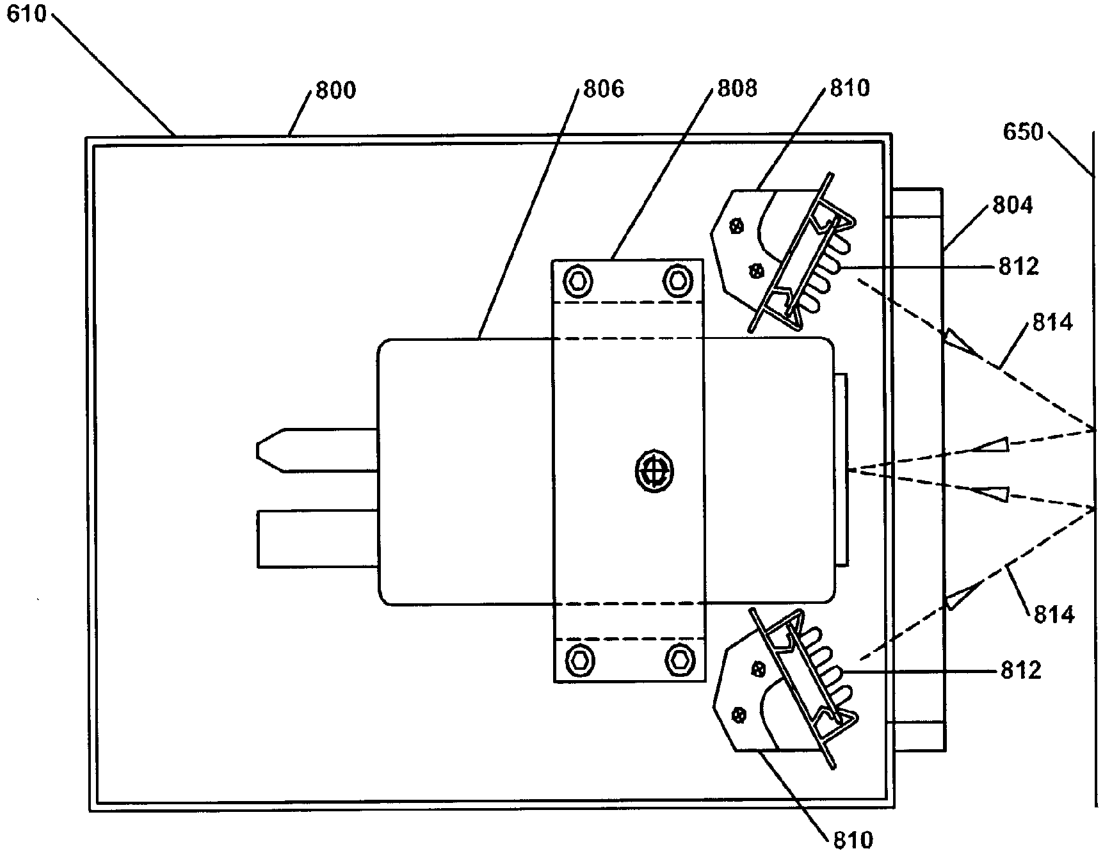
FIG. 8A is side perspective view of an imaging assembly according to the invention.

FIG. 5 is a block diagram of strobe and camera control routines. Power is supplied to the strobe through a power regulator 500. A trigger input to the circuit is used to synchronize strobe illumination with external events. The strobe can work in two modes: In pulse mode, the strobe illuminates for a fixed time synchronous to the trigger input pulse. In continuous mode, the strobe illuminates continuously until the mode input changes to pulse mode. Mode and timing control 502 provides the logic for mode switching and timing between trigger input and illumination. One or more LED arrays 506, 508, 510 can be attached to the LED power driver assembly 512. Each LED Array can have one or more LEDs for illumination. Mode and timing control 502 also interfaces with a camera trigger control 504. The camera trigger control processes the timing signal from mode and timing control and provides a camera trigger signal appropriate for triggering the camera for image acquisition. FIG. 8A is side perspective view of an imaging assembly 610 according to the invention, and which is the same as imaging assembly 612 as shown in FIGS. 6A and 6B. It comprises a color digital camera 806 and two strobes 812 enclosed in an enclosure 800. The camera 806 is mounted inside enclosure 800 by mounting brackets 808 and the strobes are mounted inside enclosure 800 by mounting brackets 810. The enclosure has a clear window 804 in front of the camera lens. The Strobes illuminate the substrate 802.

Figure 8B:
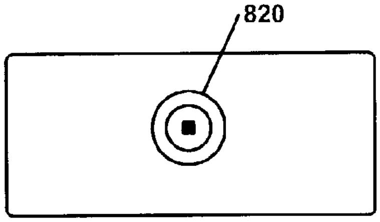
FIG. 8B and FIG. 8C show single and multiple light source strobes respectively.
Figure 8C:
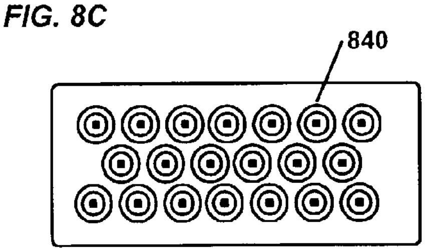

Light rays 814 from both strobes originate at the strobe LEDs and reflect back from the substrate and enter the camera lens. Each strobe may have a single light source, 820 as shown in FIG. 8B or an array of light sources 840 as shown in FIG. 8C.

Figure 7:
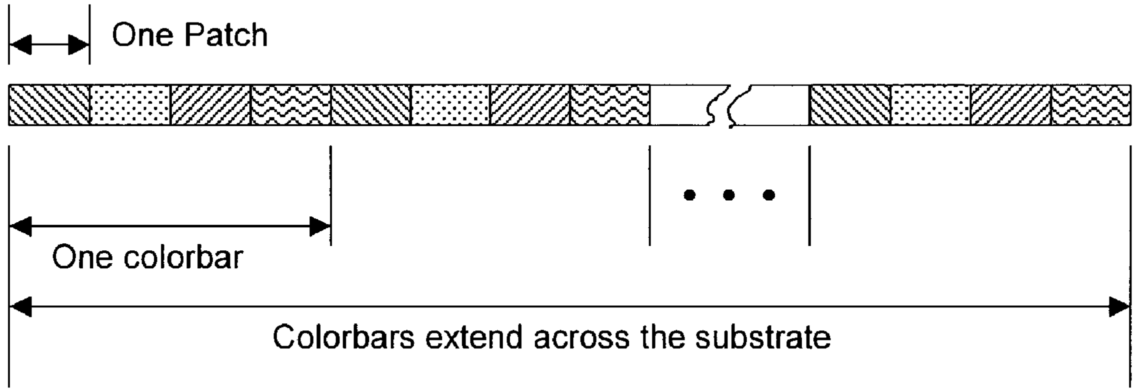
FIG. 7 is a schematic representation of color bars and color patches, which are printed on a substrate.

Color Bar Recognition Algorithm:

FIG. 7 is a schematic representation of color bars and color patches, which are printed on a substrate. Color bars are printed on each image produced by the printing press in order to obtain representative samples of pure color from each print unit. This color bar pattern typically, but not necessarily, repeats for each ink key in the print fountain. These patches are scanned by the camera and the resulting color values are used to determine the correct ink key settings.

It is important for the computer engine to be able to quickly and accurately locate the position of each patch, on the color bar from the image provided by the camera. The color bar must be distinguished from the surrounding printed material. Some existing equipment requires that a white border of some predetermined minimum width must surround the color bar. Others use unique geometric shapes or cutouts embedded within the color bar. The recognition algorithm according to the present invention allows the color bar patches to be simple rectangles of any size or proportion specified in advance. Additionally, the surrounding printed material is irrelevant to the recognition of the color bars and may therefore directly adjoin them with no bordering area, i.e. "full bleed".

Figure 2A:
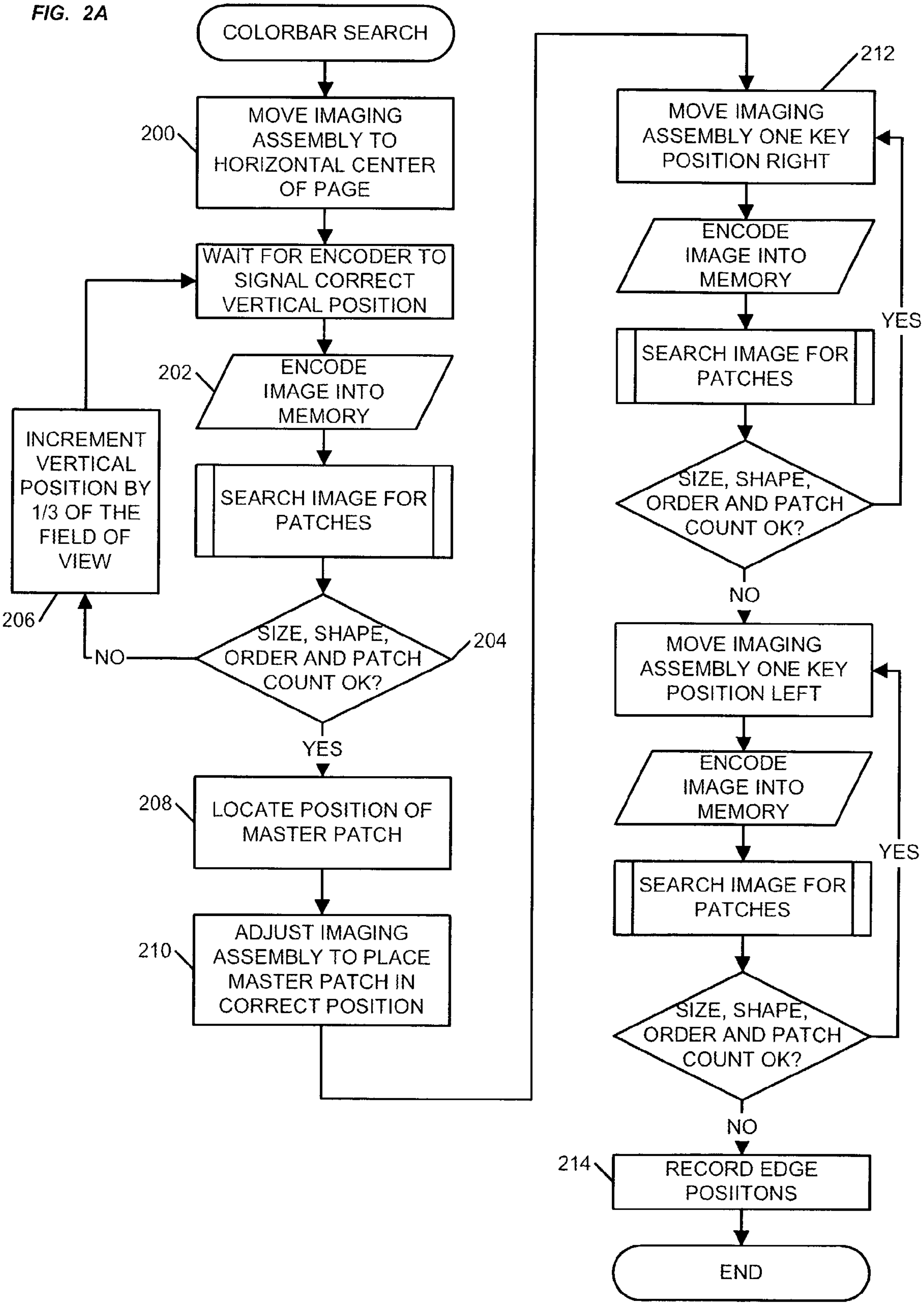
FIG. 2*a* and FIG. 2*b* are flowcharts showing the steps for recognizing color bars and color patches.
Figure 2B:
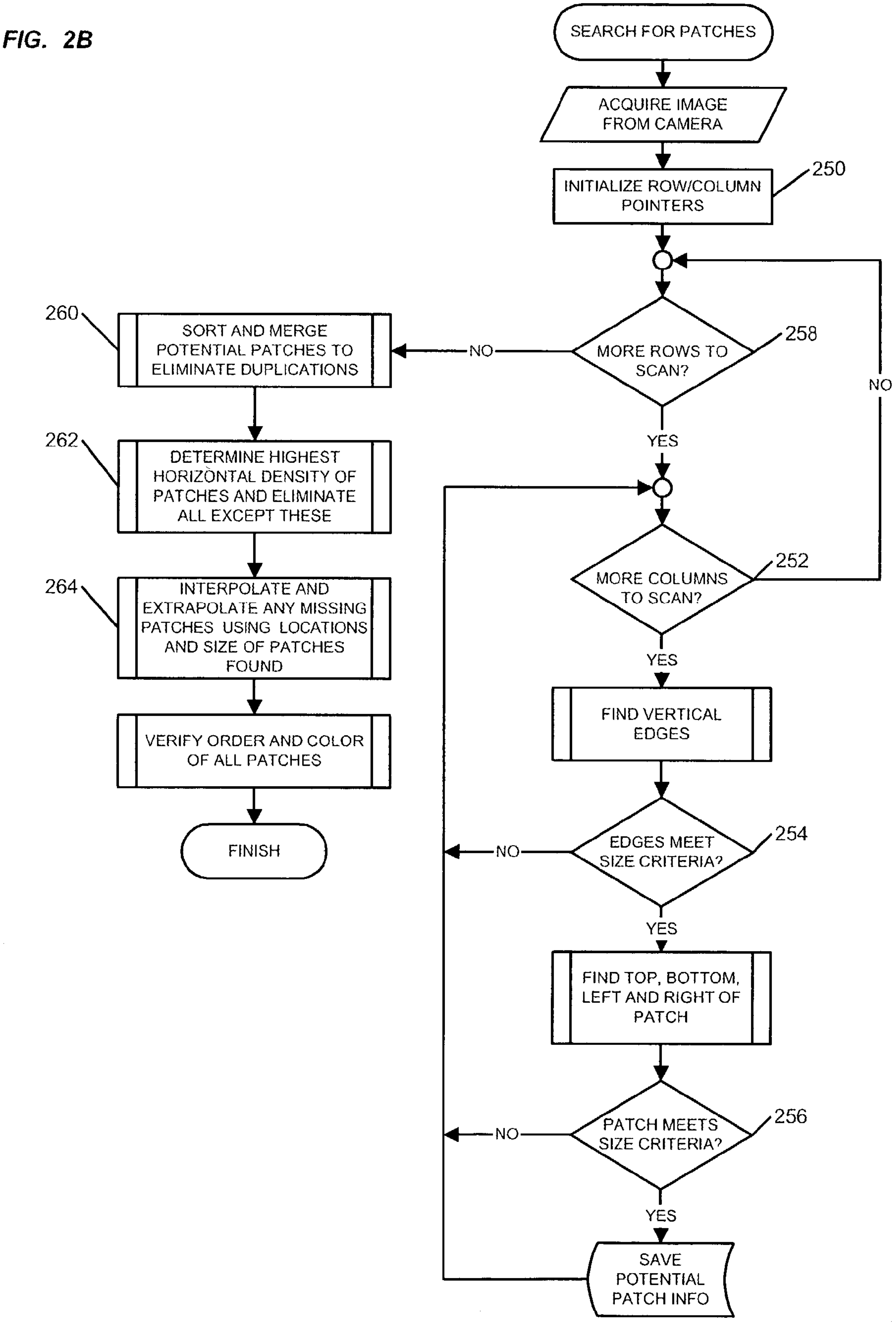

FIG. 2*a* and FIG. 2*b* are flowcharts showing the steps for recognizing color bars and color patches. The recognition algorithm assumes the color bar runs horizontally along the width of the substrate; each patch is the same size and shape as specified in advance; all of the patches for a given key fall into the field of view of the camera at one time; and no two adjacent patches are the same color.

Although the vertical location of the color bar (circumferential relative to the print cylinder) within the printed image is known in advance, differences in substrate tension, and the location of the imaging assembly relative to the position encoder require that a search be conducted to find and center the color bar. In step 200, in normal operation, an area of +/− four inches, from the expected position, are searched vertically with the imaging assembly placed in the expected center of the page horizontally. In step 202, on cue from the encoder, the strobes are triggered for an interval short enough to freeze the image from the passing substrate and long enough to properly saturate the CCD imager with color information. In step 204, this image is scanned to determine if any patches are present and qualified in shape, size and quantity. In step 206, if they are not, a new vertical position, approximately ⅓ of the field of view removed from the first, is computed and another image is taken. This continues through the scan range until a qualified color bar is found or until the operator aborts the search.

Once found, the color bar patches are examined for their color values (not density). In step 208, a previously defined master color patch is identified and its position within the field of view determined. The imaging assembly is moved horizontally, and the encoder is reprogrammed, to position the master color patch in its correct position within the field of view. The remaining color bar patches are then examined for the correct order. If this final test is passed, the color bar is fully identified. In step 210, the final position computed for the imaging assembly is then used as a reference for positioning it to image the color bar for any key or any random region of interest on the printed page.

In step 212, the camera next scans the image one key width at a time in each direction horizontally until qualified color bars are no longer found. In step 214, this is used to define the edges of the printed page, and therefore the area to be scanned for color control. For each color bar image made subsequently during the scanning process the imaging assembly's reference point is continually "fine tuned" to compensate for variations in the substrate's path through the press. This fine tuning process uses the master patch and color order in the same manner described above.

A special case for calibration is provided where the entire vertical range is searched, and the resulting position is used to establish a "zero reference" for a particular press configuration. Normally this is only done once when the system is installed, and the established zero reference is stored and used as the start point for all subsequent normal scans, thus speeding the search process considerably.

Images from the imaging assembly are digitized as "pixels", or points of light of various intensity and color. Each point of light is composed of a mix of three primary colors, red, green and blue. When mixed virtually any visible color may be produced. Each primary color has 256 possible intensities, therefore 16,777,216 possible distinct colors may exist. Because of variation in ink pigments and lighting, plus various electronic distortions and noise, a color patch will not always produce the exact same unique color value. The invention implements a unique method to distinguish colors, which is required to correctly identify each patch as unique to itself and yet different from the background image. One does not consider any one pixel, but rather always consider a group of pixels together as an average value with the red, green and blue average values computed independently. In order to compare two averaged color values, one first computes the absolute difference between each primary color value, and then applies an exponent to that difference. We then compare the largest exponential value to a constant, which represents the required contrast to consider the colors different. By choosing the exponent and the constant the sensitivity and selectivity of the system is established.

The pixels for each acquired image are arranged in the memory of the computer as repeating numerical values of red, green and blue in successive memory locations. The picture is made of X pixels wide by Y pixels high, and the numeric representation of the pixels repeats regularly through the computers memory thereby creating a representation of the visual image which may be processed mathematically. The exact memory location of any pixel is located by multiplying its Y coordinate by the number of pixels in each horizontal row and again by three, then adding its X coordinate multiplied by 3. For example, if the image is 640 pixels wide (X) and 480 pixels high (Y), and one needs to know the location (M) for the numerical value of the pixel located at 30 (Xv) by 20 (Yv), the formula would be:

$$M=(3X)(Yv)+3Xv, M=38{,}490 \text{ for red, } 38{,}491 \text{ for green, and } 38{,}492 \text{ for blue.}$$

Using this formulation each image of 640 by 480 pixels requires 921,600 numeric values for a complete representation. For the purposes of the following description, only the X and Y coordinates will be used. In practice, each X and Y coordinate pair goes through the above transformation to determine its numeric values. Also, each time a pixel value is referred to, it is actually the average value of that pixel and its neighbors, which are being considered as described above.

Referring to FIG. 2*b*, in step 250, the process for locating and qualifying the color bar patches on the acquired image begins by scanning horizontally from the upper left corner of the image. In step 252, the scan proceeds horizontally across the image in increments of a fraction of the expected patch width. This fraction is configurable to provide a balance between search speed and accuracy. A typical value is ⅓ of the expected patch width. In phase 1A, 254, the value of the current pixel is compared to the value of a pixel 1 patch width distant. If the colors are the same, a patch can not be present and the scan continues. If the patches have the required contrasting color values, a third pixel is considered yet another patch width distant. If this patch is yet a different color, then we have a potential patch with the second pixel tested somewhere near its center, and one proceeds to Phase 1B. If not, scanning continues horizontally to the end of the line. In phase 1B, 256, a potential patch located in phase one is further tested by scanning outward from the approximate center of the patch in all four directions until a sufficiently contrasting color is found. The width and height of the potential patch is then computed from these boundaries. If the dimensions of this area fit the expected patch size within a given tolerance, the exact center coordinate for the patch is computed and saved for phase 2 of the patch qualification process. In step 258, at the end of each horizontal scan, the vertical coordinate is incremented by a fraction of the expected patch height. This fraction is configurable to provide a balance between search speed and accuracy. A typical value is ⅓ of the expected patch height. The horizontal and vertical scans are repeated until the entire image is covered. It is expected, and desired, that many potential patches will be discovered by more than one pass in the scan. Phase 2 consolidates and further qualifies these patches to eliminate duplicates and random patterns, which regularly appear on the printed media along with the color bars. In phase 2, at 260, the list of potential patch center coordinates is then sorted by vertical coordinate, and patches sharing a horizontal row, within given tolerance, are merged with their center coordinates averaged. In step 262, the horizontal row with the largest number of patches which line up at the expected horizontal patch size is determined to be the "real" color bar, and all other potential patches are eliminated. In normal operation all of the patches located will fall on the exact centerline of the color bar, +/− a pixel or two. In actual use the registration of the print units is not corrected until the ink flow is established, so allowing a tolerance in position gives us the ability to begin evaluating patches before the press registration is set. In phase 3, at 264, the remaining patches are examined to look for missing patches in the sequence. Any missing patches are then interpolated by using the average size of actual patches found and the coordinates of neighboring patches. During normal operation this phase is not required, but during press startup and other critical times there may be ink missing from the page, and this interpolation allows the controller to begin making adjustments concurrent with print registration and ink flow stabilization. Interpolated patches are tagged and are not used for certain alignment procedures and certain control operations. This prevents the imaging assembly from tracking false color bars before the press is stabilized. These 3 phases are repeated for every image in which a color bar is expected, according to the algorithm presented above.

Operation of the System

Using one of the consoles, a press operator sets up the following job specific details:

Color printed by each fountain in a system; print unit to surface relation; first color to be printed in a group of color bars; location of color bar from leading edge of the print; starting and ending location for imaging assembly scanning; location for multiple regions of interest (X and Y coordinates) for each surface in the system; color bar configuration specifying following details for each key zone in the system, namely, the color of each patch (cyan/magenta/yellow/black/special color); the type of patch (solid/50% density/75% density/clear/trap/etc.), target density for each color to be printed and type of substrate to be printed on (coated/newsprint/etc.).

The operator can set up another (future) job while running a specific job. While setting up a job, the values are saved in a job file on the engine. When the operator is ready to run this job, he selects from the list of jobs stored on engine and touches the RUN button on a touch screen. Preset values of ink keys, ink roller and water are communicated to the print unit controllers and positions for all these are set by print unit controller. The engine also polls each print unit controller periodically to confirm that the communications link is alive and also to read back positions of controlled ink keys, ink roller and water settings, print unit controller status and alerts.

Operator can put one or multiple surfaces in AUTO mode. The three choices for AUTO mode are Ideal, Current and Last. Ideal mode brings all density values to that defined in the job file. Current mode reads the current density and maintains this density. Last mode brings the target density to the value stored in job file when this job was running last in AUTO mode. The engine automatically saves all job values and ink density values. When operator starts printing on the press, a Press Printing signal is issued from the press. After a user defined (by changing parameters) delay, the engine sends commands to each imaging assembly servomotor to position the imaging assembly at a specific location. These motors are also polled to confirm that the required move is accomplished. Next, a count corresponding to the color bar location is loaded into the encoder board and commands the encoder board to start trigger pulses for image acquisition. The corresponding strobe board processes this trigger signal and image acquisition is initiated through the IEEE 1394 driver software.

The acquired image is stored in the Random Access Memory (RAM) of the engine. Image analysis is performed to identify the color bar in the acquired image according to the algorithm. If a color bar is not found in the acquired image, the engine loads next count in encoder board to advance or retard the area of the printed image visible to the imaging assembly. Search distance in Y direction is programmable with engine parameters. When a valid color bar is found in an acquired image, its location is stored for use. Now, the master color patch is identified in the color bar and its location is saved. The imaging assembly is then moved such that the master patch moves to a specific location in the field of view. This operation aligns imaging assembly to the patch group from a specific key zone. Now, the imaging assembly is moved in X direction by one key zone at a time until the color bar disappears. The last location where a valid color bar was found becomes one extreme of the scanned area of substrate. The opposite end of the substrate in the X direction becomes the other extreme of the scanned area of the substrate. Once these extremes are located and stored, sequential scanning of all of the ink key zones commences.

Each patch in a key zone is identified for its color by considering an inspection area smaller than, and contained within, the color patch. Average of all the pixels in this area is calculated for red, green and blue channels. Color correction and conversion from RGB to CMYG is applied according to the following matrix equation:

$$\begin{pmatrix} C \\ M \\ Y \\ G \end{pmatrix} = 255 - \begin{pmatrix} CR, & CG, & CB \\ MR, & MG, & MB \\ YR, & YG, & YB \\ GR, & GG, & GB \end{pmatrix} \cdot \begin{pmatrix} R \\ G \\ B \end{pmatrix}$$

Where C, M, Y and G represent the primary colors used in printed media (Cyan, Magenta, Yellow and Gray), and R, G and B represent the primary colors used to represent images within computer media (Red, Green and Blue), and the remaining terms represent conversion constants.

Constants in the matrix equation are derived during the calibration process. These constants can change based on changes in color values of standard inks used in a process. Based on corrected R, G and B values for each patch, color density is determined based on look up table generated empirically. These values are compared against required density values for that specific ink zone. If the difference between these two values is more than an acceptable value or defined by parameter, a new ink key position is calculated for the print unit printing that color and engine communicates this new position to the corresponding printer unit controller. On the printing press there is a delay from the time a change in ink key position is initiated to the time the full effect of change shows up on the substrate. Typical delay on an offset printing press can be 500 impressions. When the engine makes a change in a specific ink key position, it will wait for this delay to expire before making further changes to that specific key.

The imaging assemblies may scan in both directions in the X direction. Imaging assemblies continue scanning color bars until the press stops printing or the operator changes the mode of a surface from AUTO to MANUAL. The imaging assembly continuously monitors the position of the color bars and adjusts the Y direction location to keep color bars centered in the camera field of view. Any movement of substrate in the X direction is also tracked by the engine by keeping track of master color patch location within the field of view. The X direction correction is also applied to keep the key zone in the middle of camera field of view. If an imaging assembly loses synchronization with the color bar for any reason, the color bar searching procedure is reinitiated.

If the press speed drops below a specified speed (defined by a parameter), the imaging assemblies stop scanning and are parked to one of the extremes along X axis. If the engine is in AUTO mode, scanning and key movements will resume, after the appropriate delays, once the press restarts.

When an imaging assembly is scanning a specific surface, operator can touch a VIEW key on the console to view the acquired image. In this mode, images are updated as the imaging assembly scans across the substrate in X direction. The operator can request an image of a specific key zone by touching appropriate buttons on touch screen. The operator can also request the image of a specific region of interest. Any number of regions of interest areas may be specified during the job setup or during the run in AUTO mode. When a specific image is requested, following actions take place: sequential scanning of keys on the corresponding assembly is temporarily halted; corresponding imaging assembly is positioned to the X location of required image; encoder count number corresponding to the Y location of the required image is loaded in the encoder board; image is acquired and stored in the engine for further processing; image is passed back to console; console reads the image file and displays it on the screen; normal key scanning resumes where it left off.

At this point, the operator can touch on the screen to define a required area (regular or irregular) within the image. Next, touching this area calculates the average density of all the pixels within the specified area and displays it on the screen. The engine will store both the region of interest and the defined area within it in the job file for future reference.

When print quality is acceptable, the operator can store the color values for this area. At a user programmable time interval, image acquisition of the region of interest can be done automatically and color analysis and compare with the acceptable color values stored. If a difference between these two values is more than acceptable difference, corrective action can be taken by automatically activating appropriate ink keys or annunciating it on the screen or by activating an output to drive a warning buzzer. Region of interest sizes can also be changed by changing motorized zoom and focus in the camera. At a user defined interval, user selected color value data is stored in various industry standard formats. The Customer can import this data directly into commercially available statistical quality control software.

Other maintenance functions can be performed to save the current position and/or open or close ink fountains to a predetermined value. When normal operation is resumed, the keys on these fountains return to the last saved values. Changing the encoder belt is a maintenance procedure, which may disturb the encoder timing in relation to the print cylinder. When the encoder teach mode feature is activated for a specific surface, a search is done for the colorbar within the entire possible range of Y coordinates. When a color bar is found, the offset from encoder index pulse is calculated and saved.

Color bar location, type and size are very important factors in accurate and efficient color measurement. Having color bars on the printed substrate is disadvantageous due to extra trimming cost, waste removal cost and substrate waste cost. For these reasons, it is desirable to have the smallest possible color bars. During the start of the printing process two factors affect the print quality the most, namely register and color. It is also well known that most automatic register control systems cannot identify register marks unless the color for the marks are correct and the print is clear. Most color controls have problems recognizing color bars due to register error between colors. Automatic register and color controls work sequentially instead of working in tandem. The performance of one affects the performance of the other. The overall effect of this interdependence is increased waste. The color bar recognition algorithm according to this invention is very tolerant to color register error One technique which does allow adjustment of register and color together is disclosed in copending patent application Ser. No. 09/486,684 which is incorporated herein by reference. The combination of these two technologies provides the best performance since both controls work in tandem.

While the present invention has been particularly shown and described with reference to preferred embodiments, it will be readily appreciated by those of ordinary skill in the art that various changes and modifications may be made without departing from the spirit and scope of the invention.

It is intended that the claims be interpreted to cover the disclosed embodiment, those alternatives which have been discussed above and all equivalents thereto.

What is claimed is:

1. An apparatus for measuring the reflective density of one or more colored image portions, having one or more colors, which are printed on a planar substrate comprising:

(a) a digital video camera capable of acquiring one or more colored images, which images have one or more colors and which are printed on a planar substrate, and producing a digitized representation thereof;

(b) a strobe for illuminating the one or more colored images;

(c) a linear drive for moving the strobe and camera together across the substrate;

(d) a drive controller for controlling the positioning and movement of the strobe and camera across the substrate to a position of the image at any location linearly on the substrate;

(e) an encoder/controller for positioning the strobe and camera to a position of the one or more colored images at any location on the substrate, in a direction perpendicular to the direction of movement of the linear drive;

(f) a first selector for directing the camera at one or more colored images positioned on the substrate;

(g) a second selector for selecting a portion of the image;

(h) a processor for measuring and analyzing the color intensity of the portion of the image and producing a reflective density values thereof, (i) a first memory for storing said reflective density values;

(j) a second memory for storing standard density values for the portion of the one or more colored images;

(k) a comparator for comparing the reflective density values for the portion of the one or more colored images to the standard density values for the portion of the one or more colored images.

2. The apparatus of claim 1 wherein the planar substrate is traveling and the linear drive moves perpendicular to the direction of travel of the substrate.

3. The apparatus of claim 1 wherein the planar substrate is stationary and the linear drive moves in two orthogonal directions relative to a surface of the planar substrate.

4. The apparatus or claim 1 wherein the strobe is capable of either continuously or intermittently illuminating the one or more colored images.

5. The apparatus of claim 1 wherein die strobe comprises one or more white light emitting diodes.

6. The apparatus of claim 1 further comprising a display screen for presenting a visual representation of the one or more colored images, the portion of the one or inure colored images, the reflective density values, the standard density values, a comparison of the reflective density values to the standard density values, or combinations thereof.

7. A process for measuring the reflective density of one or more colored image portions, having one or more colors, which arc printed on a planar substrate comprising:

(a) controlling the positioning and linear movement of a strobe and a digital video camera across a planar substrate, which substrate has one or more colored images having one or more colors printed thereon;

(b) illuminating the one or more colored images printed on the substrate with a strobe, wherein the strobe comprises one or more white light emitting diodes, and then color correcting the light from the light emitting diodes;

(c) selecting and acquiring one or more of the colored images via the digital video camera, and producing a digitized representation thereof;

(d) selecting a portion of the one or more of the colored images;

(e) measuring and analyzing the color intensity of the selected portion of the one or more colored images and producing reflective density values thereof, and storing said reflective density values in a first memory;

(f) comparing the reflective density values for the portion of the one or more colored images to standard density values in a second memory for the portion of the one or more colored images.

8. The process of claim 7 wherein the planar substrate is traveling and the linear drive moves perpendicular to the direction of travel of the substrate.

9. The process of claim 7 wherein the planar substrate is stationary and to linear drive moves in two orthogonal directions relative to a surface of the planar substrate.

10. The process of claim 7 wherein the strobe either continuously or intermittently illuminates the one or more colored images.

11. The process of claim 7 further comprising presenting a visual representation of the one or more colored images, the portion of the one or more colored images, the reflective density values, the standard density values, a comparison of the reflective density values to the standard density values, or combinations thereof on a display screen.

12. A color control system for controlling the amount of ink red from a plurality of inking units in a multicolored printing press onto a planar substrate fed through the press, which substrate is in a web or sheet form, said substrate having a plurality of spaced apart color marker images printed thereon from the inking units, which images extend across the width of the substrate, which printing press comprises a plurality of adjustable ink control mechanism across the inking units to control the amount of ink fed from the inking units onto the substrate, the system comprising:

(a) a digital video camera capable of acquiring one or more colored images, which images have one or more colors and which arc printed on a planar substrate, and producing a digitized representation thereof;

(b) a strobe for illuminating the one or more colored images;

(c) a linear drive for moving the strobe and camera together across the substrate;

(d) a drive controller for controlling the positioning and movement of the strobe and camera across the substrate to a position of the one or more colored images at any location linearly on the substrate;

(e) an encoder/controller for positioning the strobe and camera to a position of the one or more colored images at any location on the substrate, in a direction perpendicular to the direction of movement of the linear drive;

(f) a first selector for directing the camera at one or more colored images positioned on the substrate;

(g) a second selector for selecting a portion of the one or more colored images;

(h) a processor for measuring and analyzing the color intensity of the portion of the one or more colored images and producing a reflective density values thereof, (i) a first memory for storing said reflective density values;

(j) a second memory for storing standard density values for the portion of the one or more colored images;

(k) a comparator for comparing the reflective density values for the portion of the one or more colored images to the standard density values for the portion of the one or more colored images;

(l) a calculator for calculating the amount of adjustment required for the ink control mechanisms on the press to maintain the color density of the portion of the one or more colored images; and (m) an ink controller for effecting adjustment of the ink control mechanisms to maintain the color density of the portion of the one or more colored images.

13. The system of claim 12 wherein the planar substrate is traveling and the linear drive moves perpendicular to the direction of travel of the substrate.

14. The system of claim 12 wherein the planar substrate is stationary and the liner drive moves in two orthogonal directions relative to a surface of the planar substrate.

15. The system of claim 12 wherein the strobe is capable of either continuously or intermittently illuminating the one or more colored images.

16. The system of claim 12 wherein the strobe comprises one or more white light emitting diodes.

17. The system of claim 12 further comprising a display screen for presenting a visual representation of the one or more colored images, the portion of the one or more colored images, the reflective density values, the standard density values, a comparison of the reflective density values to the standard density values, or combinations thereof.

18. The system of claim 12 wherein the ink control mechanisms comprise motorized keys.

19. A process for controlling the amount of ink fed from a plurality of inking units in a multicolored printing press onto a planar substrate fed through the press, which substrate is in a web or sheet form, said substrate having a plurality of spaced apart color marker images printed thereon from the inking units, which images extend across the width of the substrate, which printing press comprises a plurality of adjustable ink control mechanism across the inking units to control the amount of ink fed from the inking units onto the substrate, the system comprising:

(a) controlling the positioning and linear movement of a strobe and a digital video camera across a planar substrate, which substrate has one or more colored images having one or more colors printed thereon;

(b) illuminating the one or more colored images printed on the substrate with a strobe, wherein the strobe comprises one or more white light emitting diodes, and then color correcting the light from the light emitting diodes;

(c) selecting and acquiring one or more of the colored images via the digital video camera, and producing a digitized representation thereof;

(d) selecting a portion of the one or more of the colored images;

(e) measuring and analyzing the color intensity of the selected portion of the one or more colored images and producing reflective density values thereof, and storing said reflective density values in a first memory;

(f) comparing the reflective density values for the portion of the one or more colored images to standard density values in a second memory forte portion of the one or more colored images;

(g) calculating the amount of adjustment required for the ink control mechanisms on the press to maintain the color density of the portion of the one or more colored images; and (h) effecting adjustment of the ink control mechanisms to maintain the color density of the portion of the one or more colored images.

20. The process of claim 19 wherein the planar substrate is traveling and the linear drive moves perpendicular to the direction of travel of the substrate.

21. The process of claim 19 wherein the planar substrate is stationary and the linear drive moves in two orthogonal directions relative to a surface of the planar substrate.

22. The process of claim 19 wherein the strobe either continuously or intermittently illuminates the one or more colored images.

23. The process of claim 19 further comprising presenting a visual representation of the one or more colored images, the portion of the one or more colored images, the reflective density values, the standard density values, a comparison of the reflective density values to the standard density values, or combinations thereof on a display screen.

24. The process of claim 19 wherein the ink control mechanisms comprise motorized keys.

25. A process for controlling the amount of ink fed from a plurality of inking units in a multicolored printing press onto a planar substrate fed through the press, which substrate is in a web or sheet form, said substrate having a plurality of spaced apart color marker images printed thereon from the inking units, which images extend across the width of the substrate, which printing press comprises a plurality of adjustable ink control mechanism across the inking units to control the amount of ink fed from the inking units onto the substrate, the system comprising (i) providing a color control system comprising:

(a) a digital video camera capable of acquiring one or more colored images, which images have one or more colors and which are printed on a planar substrate, and producing a digitized representation thereof;

(b) a strobe for illuminating the one or more colored images;

(c) a linear drive for moving the strobe and camera together across the substrate;

(d) a drive controller for controlling the positioning and movement of the strobe and camera across the substrate to a position of the one or more colored images at any location linearly on the substrate;

(e) an encoder/controller for positioning the strobe and camera to a position of the one or more colored images at any location on the substrate, in a direction perpendicular to the direction of movement of the linear drive;

(f) a first selector for directing the camera at one or more colored images positioned on the substrate;

(g) a second selector for selecting a portion of the one or more colored images;

(h) a processor for measuring and analyzing the color intensity of the portion of the one or more colored images and producing a reflective density values thereof;

(i) a first memory for storing said reflective density values;

(j) a second memory for storing standard density values for the portion of the one or more colored images;

(k) a comparator for comparing the reflective density values for the portion of the one or more colored images to the standard density values for the portion of the one or more colored images;

(l) a calculator for calculating the amount of adjustment required for the ink control mechanisms on the press to maintain the color density of the portion of the one or more colored images; and (ii) effecting adjustment of the ink control mechanisms to maintain the color density of the portion of the one or more colored images.

26. The process of claim 25 wherein the planar substrate is traveling and the linear drive moves perpendicular to the direction of travel of the substrate.

27. The process of claim 25 wherein the planar substrate is stationary and the linear drive moves in two orthogonal directions relative to a surface of the planar substrate.

28. The process of claim 25 wherein the strobe either continuously or intermittently illuminates the one or more colored images.

29. The process of claim 25 wherein the strobe comprises one or more white light emitting diodes.

30. The process of claim 25 further comprising presenting a visual representation of the one or more colored images, the portion of the one or more colored images, the reflective density values, the standard density values, a comparison of the reflective density values to the standard density values, or combinations thereof on a display screen.

31. The process of claim 25 wherein the ink control mechanisms comprise motorized keys.

* * * * *